United States Patent [19]

Totterdell

[11] 4,234,784

[45] Nov. 18, 1980

[54] COOKING APPLIANCE CONTROLS

[75] Inventor: Anthony C. Totterdell, London, England

[73] Assignee: Thorn Domestic Appliances (Electrical) Limited, London, England

[21] Appl. No.: 184

[22] Filed: Jan. 2, 1979

[30] Foreign Application Priority Data

Jan. 17, 1978 [GB] United Kingdom ............... 1849/78

[51] Int. Cl.³ .......................... H05B 1/02; G08C 9/00
[52] U.S. Cl. .................................. 219/506; 219/492; 219/10.55 B; 340/365 C; 340/365 E; 364/477
[58] Field of Search ......... 219/492, 506, 516, 10.55 B, 219/10.77 B; 361/181; 307/144 R; 364/477, 120; 235/92 EV, 92 EC, 92 FP; 340/365 R, 365 S, 365 E, 562

[56] References Cited

U.S. PATENT DOCUMENTS

| 3,581,068 | 5/1971 | Wyatt | 235/92 EC |
|---|---|---|---|
| 3,839,710 | 10/1974 | Rogers | 340/365 E |
| 3,982,236 | 9/1976 | Kafafian | 340/365 E |
| 4,046,991 | 9/1977 | Sefton et al. | 219/497 |
| 4,086,470 | 4/1978 | Ashbee | 235/92 EV |
| 4,129,217 | 4/1979 | Tucker | 219/10.77 |

Primary Examiner—B. A. Reynolds
Assistant Examiner—M. Paschall
Attorney, Agent, or Firm—Robert F. O'Connell

[57] ABSTRACT

A cooking appliance with touch pad controls is protected against inadvertent turning of a cooking facility such as a hob ring to full power by a spillage on an UP pad (increase temperature). A control circuit turns the facility off if the UP pad signals that it is touched for longer than say 5-7 seconds. Similarly a warning can be given if a DOWN pad remains touched too long, to prevent inadvertent turning off of a facility.

9 Claims, 2 Drawing Figures

COOKING APPLIANCE CONTROLS

The present invention relates to cooking apparatus, in particular to controls thereof. Of recent years there have been various developments moving away from conventional knob or tap type controls for hobs, ovens, and other cooking appliances, varying degrees of automation being introduced. In particular, it is known to provide an array of keys which select particular facilities on the appliance e.g. FRONT LEFT RING or MAIN OVEN and so on, and which allow the cooking temperature of the selected facility to be preset, either as an actual temperature in the case of, say, an oven or as a scale value, e.g. a number from 1 to 9, in the case of say, a hob ring. An actual temperature setting causes the power input to the selected facility to be controlled by feedback from a temperature sensor. A scale value setting directly determines the mean power input to the selected facility.

In order to simplify the control keys it is known to utilize an UP and a DOWN key in conjunction with a display which shows the preset temperature value for the selected facility. The UP key causes the present value to step upwardly, e.g. by ten degree increments of unity or fractional increments in the case of a scale number. The user presses this key until the displayed value reaches the desired value and then removes his or her finger. The DOWN key operates in the converse manner.

It is possible to provide separate UP and DOWN keys and also an OFF key for each facility, whereby use of these keys also effects selection of the facility. The DOWN key can be omitted if the user is required to reduce the temperature by use of the OFF key and then the UP key. It is also possible to use UP, DOWN and OFF keys shared between separate facilities by use of multiplexing techniques, additional keys then being required for selection of the facilities.

Another development lies in the replacement of push button keys by touch keys, referred to from now on as touch pads. Push button keys have to be depressed to operate them. Whereas touch pads have no moving parts but respond simply to the proximity of the operating finger, normally by sensing the capacitance change created thereby. Touch pads offer several advantages to the designer of cooking appliances. Unlike push button keys, they cannot (when suitably designed) be fouled by ingress of moisture or foodstuffs, and they offer the designer more scope for placing controls where they are both convenient to use and aesthetically satisfying. Externally the touch pads need appear only as suitable symbols provided on a flat panel forming a surface of the appliance. Under this surface are disposed the electrical means which sense the proximity of the operating finger.

One attractive possibility is to place an array of touch pads for a hob on the hob surface itself, e.g. down one side of the hob. However, in this location there is a risk that a heavy spillage on the hob or inadvertant placement of say a damp cloth on the hob will cause unintentional operation of touch pads. This trouble can also occur in relation to touch pads in other locations or other appliances. If the pads include one or more UP pads, a mishap of this nature can cause an unused hob ring, for example, to be turned on at maximum power if the spillage or article overlies an UP pad. If the pads include one or more DOWN pads, it is possible inadvertantly to turn off a ring which is intended to be in use.

The object of the present invention is to overcome this problem.

Briefly, the cooking appliance control means are arranged to initiate a predetermined delay whenever the preset temperature value reaches at least one of the maximum and minimum values. The control means terminate the supply of power to the facility at the end of the delay and/or provide a warning signal if a touch pad is still then signalling that it is touched.

The delay can be long enough, say a few seconds (e.g. 5 or 7 seconds), to be sure that a facility will not be automatically deenergised when the user deliberately sets the maximum (or minimum) temperature value and is merely a little tardy in removing his or her finger from the UP or DOWN pad. When, however, the "touching" of the pad is prolonged because it is the result of some mishap such as a heavy spillage or a misplaced article, automatic deenergisation will occur and a possible accident be avoided, and/or a warning signal (a buzzer for example) will draw the attention of the user to the fault condition.

The termination of the supply of power is preferably effected by resetting the corresponding stored value to zero with display of a corresponding symbol by the display device. In this case it may also be arranged to actuate some form of warning device, e.g. a warning lamp or buzzer.

The controls means can be analog or digital circuitry constructed to perform the required functions (hardware embodiment) or a microprocessor programmed to perform these functions (software embodiment).

The invention will be described in more detail, by way of example, with reference to the accompanying drawings, in which.

There will first of all be described a hardware embodiment of the invention illustrating clearly the principles of the control means. It will be understood that the functions of the various blocks can readily be performed by corresponding microprocessor programs, one suitable microprocessor being Texas Instruments TMS 1000.

Figure 1:
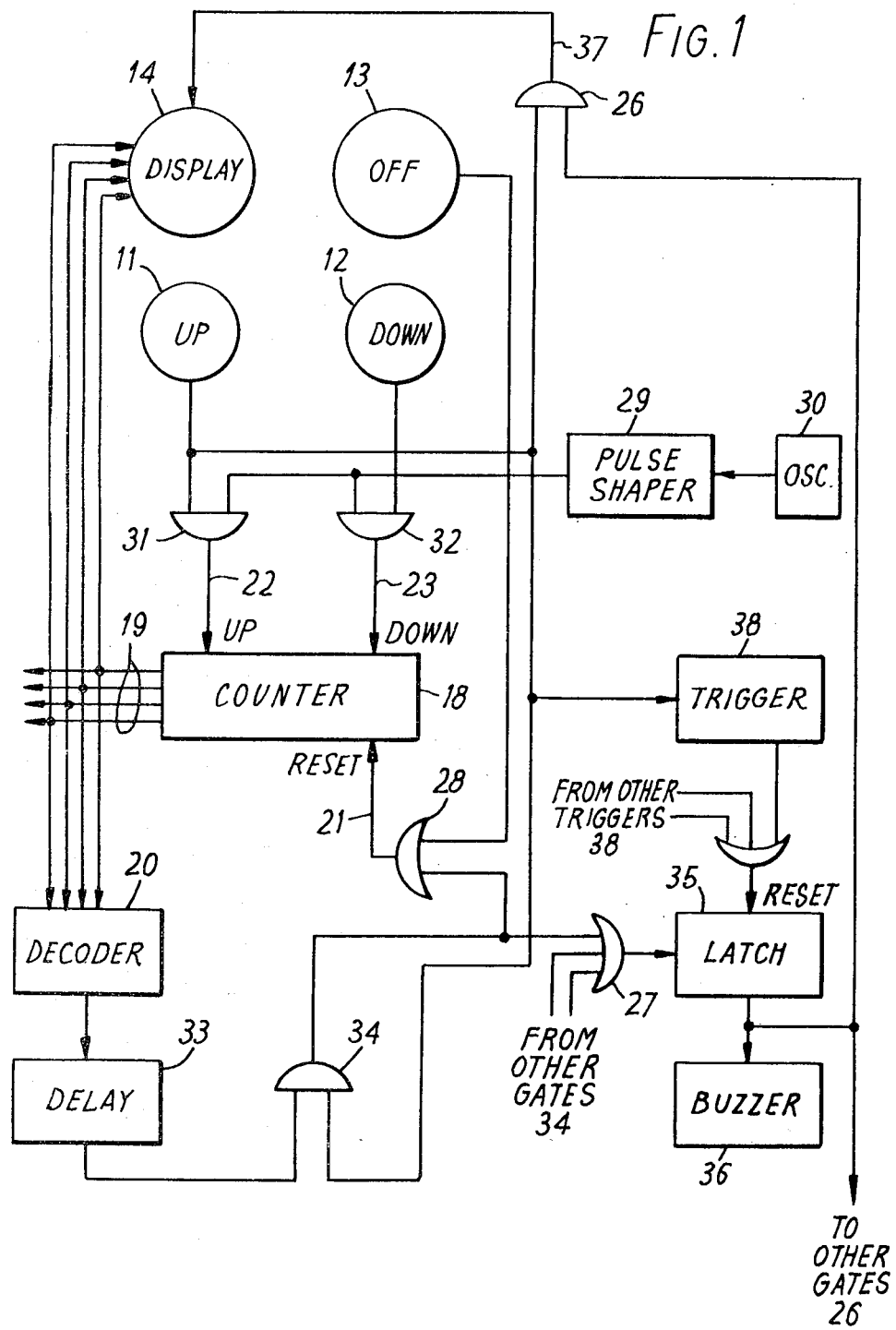
FIG. 1 is a block diagram of hardware embodiment of the invention.

The embodiment illustrated in FIG. 1 relates to one ring of a hob, the illustrated circuitry and touch pads being repeated for the other rings. A control panel on the hob comprises in respect of each ring an UP pad 11, a down pad 12, an OFF pad 13 and a digital display device 14.

The touch pads control the application of signals described below to an up/down counter 18, which stores values from 0 to 9 and which may be a single decade BCD counter. The bit-parallel outputs from the counter on lines 19 are applied to a conventional controller (not shown) such as a thyristor controller which controls the supply of power to the ring, from power off when a counter stores 0 up to full power when the counter stores 9. The lines 19 are also connected to the display device 14 and to a decoder 20 whose function is described below.

The counter 18 is a bidirectional counter having three input lines 21, 22 and 23 by way of which the counter can respectively be caused to reset to 0, to count upwardly and to count downwardly.

The RESET signal on line 21 is provided by the OFF touch pad 13 via an OR gate 28. When either of the UP or DOWN touch pads 11 or 12 is touched, pulses are gated to the counter 18 from a pulse shaper 29 driven at a rate of a few pulses per second by an oscillator 30 which may be common to all rings. If the UP pad 11 is the touched pad, these pulses pass to the UP input 22 via a AND gate 31 but if the DOWN pad 12 is touched pad, the pulses pass to the DOWN input 23 via an AND gate 32. Pulses pass to the input 22 or 23 only so long as the pad 11 or 12 remains touched.

The user can thus select a ring by touching one of the pads and, depending on which pad is touched, raise the temperature (by touching the pad 11), lower the temperature (by touching the pad 12) or turn the ring off (by touching the pad 13). When raising or lowering the temperature, the user observes the display 14 and removes his or her finger when the desired value is reached.

In order to overcome the problem discussed above, the decoder 20 decodes the value 9 and on so doing provides a signal to a delay device 33 which runs for say 7 seconds. At the end of this delay time, the device 33 provides an enabling pulse to an AND gate 34 whose second input is from the UP touch pad 11. If the UP pad 11 remains touched, whether by the user or by a heavy spillage or any misplaced article, at the time of the enabling pulse, an output pulse is proceded by the gate 34 which is applied to the RESET input 21 via the OR gate 28. The ring is thus turned off.

Furthermore, the pulse from the gate 34 sets a flip-flop latch 35 common to all rings, via an OR gate 27, which operates a buzzer 36 to give warning of the mishap which has occurred. If desired, the latch 35 can also provide a forcing input to the display 14, on line 37 and via an AND gate 26, which causes the display to show a special warning symbol, say three horizontal bars, instead of the value 0 commanded by the counter 18. A signal on line 37 overrides the signals on lines 19. When the user attends to the hob to rectify the mishap, the latch 35 is r4set by a trigger circuit 38 which is triggered when the "touched" signal disappears from the pad 11.

Figure 2:
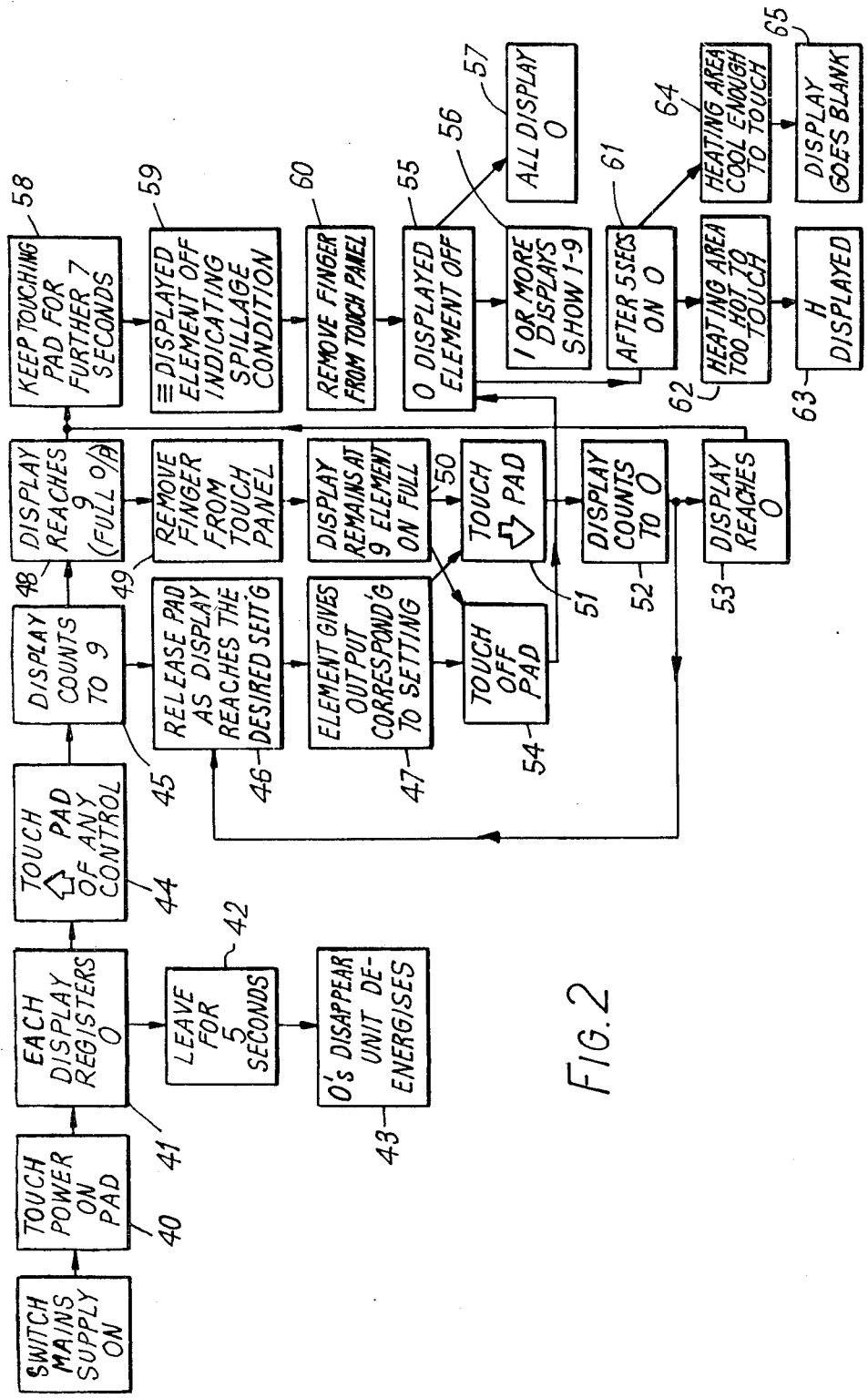
FIG. 2 is a flow diagram of a software embodiment of the invention.

FIG. 2 is a flow diagram of a software embodiment comprising routines which are readily programmable on the aforementioned TMS 1000 microprocessor, for example. As well as the three pads described in relation to FIG. 1 for each ring, there is a single POWER ON pad which has to be operated first to turn on the hob. When this pad is touched (block 40) all displays register 0 (block 41) and, as a safety feature additional to that described in relation to FIG. 1, if no UP pad is touched within 5 seconds, the hob turns itself off again (blocks 42 and 43). If, however, an UP pad is touched and the finger is removed, the corresponding element or ring is turned on to the selected setting less than 9 (blocks 44, 45, 46 and 47) or to the 9 setting (blocks 44, 45, 48, 49 and 50): Thereafter the ring may be turned down (blocks 51 and 52), if desired to OFF (block 53) or may be turned OFF by touching the corresponding OFF pad (block 54). Once a ring is OFF, its display is 0 (block 55) and this will yield a condition in which either one or more displays show 0 to 9 (block 56) or all displays show 0 (block 57).

The automatic turning off of a ring occurs when the display reaches 9 (block 48) if the UP pad is still touched after 7 seconds (block 58). This causes the ring to be turned OFF and the three-bar symbol to be displayed (block 59). Once the touching ceases, (which may actually mean that, say, a spillage is cleared), shown in block 60 the system goes to block 55, replacing the three-bar symbol by 0. Block 59 can also comprise the function "sound warning buzzer".

In order to deal additionally with the problem of inadvertant turning off of rings by spillages, block 53 (display reaches 0) also goes to block 58 which leads to the three-bar display and optionally also sounding of the buzzer (block 59).

When a display goes to 0 (block 55) and after a 5 second delay (block 61), the 0 is removed and, if the ring is too hot to touch, replaced by the symbol H (blocks 62 and 63). Once the ring is cool enough to touch, the display is cleared (blocks 64 and 65).

What is claimed is:

1. A cooking appliance having controls comprising an array of touch pads and a display device for displaying a preset temperature value, the touch pads including at least one pad for changing the preset and displayed temperature value for a cooking facility of the appliance, control means responsive to touching of the touch pads to store a signal representing the preset temperature value for the facility, and means responsive to the stored signal to control the supply of power to the cooking facility, wherein the control means are arranged to initiate a predetermined delay whenever the preset temperature value reaches at least one of the maximum and minimum presettable values and at the end of the delay to effect at least one of the operations of terminating the supply of power to the facility and providing a warning signal, if a touched pad is still signalling that it is touched at the end of the delay.

2. A cooking appliance according to claim 1, wherein there is an UP pad and the control means terminate the power supply to the facility at the end of the delay, if the UP pad is still then signalling that it is touched, by resetting the stored signal to zero.

3. A cooking appliance according to claim 2, wherein the control means, when resetting the stored signal to zero at the end of the delay, cause the display device to display a warning signal other than zero.

4. A cooking appliance according to claim 2, comprising a latch circuit arranged to be set when the stored signal is reset to zero at the end of the delay and, when set, to effect at least one of the operations of causing an audible warning signal to be provided and causing the display device to display a warning signal other than zero.

5. A cooking appliance according to claim 4, comprising a trigger circuit responsive to disappearance of the signal indicating that the UP pad is touched to reset the latch circuit.

6. A cooking appliance according to claim 1, wherein the control means comprise a microprocessor programmed to establish the predetermined delay and to control the stored signal in accordance with which touch pads are touched.

7. A cooking appliance having controls comprising an array of touch pads and a display device for displaying a preset temperature value, the touch pads including an UP pad for increasing the preset and displayed temperatures value for a cooking facility of the appliance, control means responsive to touching of the touch pads to store a signal representing the preset temperature value for the facility, and means responsive to the stored signal to control the supply of power to the cooking facility, wherein the control means are arranged to initiate a predetermined delay whenever the preset temperature value reaches the maximum presettable value and to terminate the supply of power to the facility at the end of the delay if the UP pad is still then signalling that it is touched.

8. A cooking appliance according to claim 7, wherein the control means, when resetting the stored signal to zero at the end of the delay, cause the display device to display a warning signal other than zero.

9. A cooking appliance according to claim 7, comprising a latch circuit arranged to be set when the stored signal is reset to zero at the end of the delay and, when set, to cause an audible warning signal to be provided.

* * * * *